Figure 1:
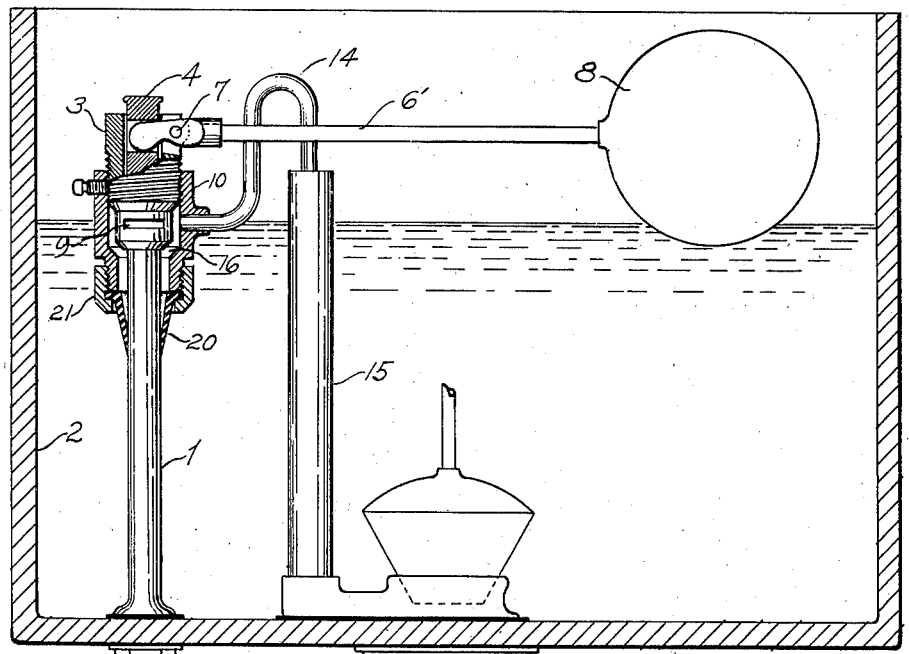

May 1, 1945.          P. G. FUNK          2,374,989
VALVE
Filed April 21, 1943

INVENTOR.
Peter George Funk
BY
Attorney

Patented May 1, 1945

2,374,989

UNITED STATES PATENT OFFICE 2,374,989

VALVE

Peter George Funk, Ridgewood, N. Y.

Application April 21, 1943, Serial No. 483,867

2 Claims. (Cl. 137—69)

The present invention relates to valves for controlling the flow of fluids, and more particularly to automatic valves that are adjustable with respect to the rate of flow permitted thereby and restrictive with respect to the direction of flow of such fluids.

An important object of the invention is to provide a valve for controlling the rate of flow of fluids, which is capable of easy adjustment.

Another object is to provide an adjustable valve, the setting of which is maintained constant over a long period of use.

An additional object of the invention is to provide an adjustable automatic valve having a wide restrictable path.

Another object of the invention is to provide a path for fluids in an adjustable automatic valve adapted to widely distribute fluids in both opened and constricted conditions.

A further object is to provide a valve that will be quiet in operation.

Another object of the invention is to provide a valve for controlling the flow of fluid from a sanitary to an unsanitary storage place.

A still further object of the invention is to provide a valve for a toilet flushing system adapted to prevent the back flow of water into the supply pipe.

Another object is to provide an adjustable automatic valve, the adjustable elements of which will be subject to negligible wear.

According to a characteristic feature of the invention, a cylindrical collar is disposed concentrically around a conventional valve system. The latter includes a piston rectilinearly movable within a cylinder to and away from a valve seat in response to automatic actuating means, said piston being provided with a seat to engage the open end of a fluid supply pipe which extends into said cylinder. Said cylindrical collar is provided at one end thereof with internal threads adapted to engage external threads provided on said valve cylinder a short distance from one of its ends, whereby a portion of the valve cylinder is adapted to extend into said cylindrical collar. The valve cylinder is provided with suitable apertures communicating with the interior of said cylindrical collar and constituting paths for the fluid released by the valve. The said cylindrical collar is also provided with apertures, one of which communicates with a sewer trap, and the other of which communicates with the supply tank served by the valve.

The aperture of said cylindrical collar which communicates with the supply tank is formed at the other end of said collar by the interior surface of said collar and in part by the outer surface of that portion of said cylinder which extends into said collar and in part by the outer surface of a portion of the supply pipe referred to. The end portion of said valve cylinder which extends into said collar is provided with an external surface configuration of such character, that in combination with a complementary configuration on the interior surface of the cylindrical collar referred to, an annular path for the fluid whose passage is to be controlled, is formed. The complementary surfaces which define the path in this manner are preferably conical. Rotation of said collar on its lengthwise axis on said valve cylinder with which it is in threaded engagement serves to enlarge or restrict the capacity of said path.

According to another characteristic feature of the invention, a washer made of rubber or other resilient material and having a frusto-conical shape, is disposed around said supply pipe, the wider end of said washer being suitably held against said cylindrical collar at the end thereof which is provided with the aperture communicating with the supply tank, and in communication with said aperture. The narrowed end of said washer is adapted to engage a portion of the exterior surface of said supply pipe in resiliently tight fit. The washer is thus adapted to control the direction of flow of the fluid released by the valve system referred to. Thus, in case of pressure loss in the supply pipe, back-flow is prevented.

Further objects and features of the invention will become apparent to those skilled in the art as the description progresses.

The invention will now be described in more detail, reference being made to the accompanying drawing, in which like reference numerals refer to like parts throughout the two figures thereof.

Figure 2:
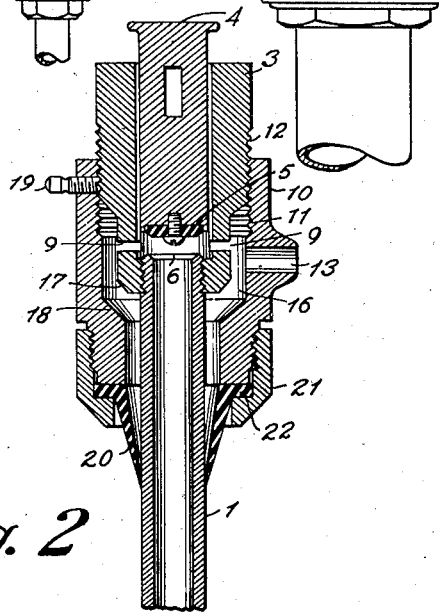

In the drawing:

Fig. 1 shows an elevation, partly in section, of a toilet flushing system in which an embodiment of my invention is incorporated, and Fig. 2 shows an enlarged sectional elevation of the valve structure of Fig 1.

Referring to Fig. 1, a supply pipe 1 is adapted to supply fluid to tank 2. A valve system responsive to the level of fluid in tank 2 is constituted by valve cylinder 3, piston 4, valve face 5 on said piston, shown in Fig. 2, and the open end 6 of supply pipe 1, constituting the valve seat, which extends into said cylinder 3 and which is also shown in Fig. 2. Piston 4 is adapted to be moved within said cylinder 3 in a rectilinear sense to and away from seat 6 by the lever system comprising rod 6' mounted on fulcrum 7, and which is actuated by float 8.

Referring to Fig. 2, valve cylinder 3 is provided with apertures 9 communicating with its interior. Surrounding that portion of said valve cylinder 3 provided with the apertures 9, is a cylindrical collar 10. Collar 10 is adapted to be associated with said cylinder 3 by a threaded engagement shown at 11, 12. The threads 11 are provided on the inner surface of collar 10 at one end thereof, and engage threads 12 disposed on the outer surface of cylinder 3 at a distance away from either end of said cylinder and at a point such that when cylinder 3 and collar 10 are in threaded engagement, said collar confines that portion of valve cylinder 3 which is provided with apertures 9.

Communicating with the interior of collar 10 is a channel 13 which, with tubing 14 and pipe 15, forms a path for the fluid to a sewer trap, not shown.

Also communicating with the interior of said cylindrical collar 10, is an annular opening 16, formed by an inner conical wall of collar 10 and an outer conical member 3. Thus advancing collar 10 on cylinder threads 12 results in decreasing the cross-sectional area of opening 16 and lessens the rate of flow of the fluid through said opening. By unscrewing the collar 10 on cylinder threads 12, the cross-sectional area of opening 16 is enlarged, resulting in an increased rate of fluid flow therethrough. Set screw 19 is adapted to hold collar 10 in a set position with respect to cylinder 3.

The presence of tubing 14 does not present an appreciable obstacle to a setting of collar 10 on cylinder 3. Each setting is usually preserved over a long interval of time, and to remove said tubing from its engagement with collar 10, which may be either threaded or frictional, prior to an adjustment, does not involve a serious drawback.

The path for the fluid formed by annular opening 16 communicates with an annular path formed by the interior surface of a frusto-conical washer 20 made of rubber or other resilient material, and the exterior surface of supply pipe 1. Washer 20 is affixed at its wider end to the free end of collar 10 by means of ring 21 which is in threaded engagement with said free end of collar 10. The narrowed end of washer 20 is provided with an opening substantially congruous to a cross-section of supply pipe 1, whereby the wall of said narrowed opening is adapted to engage the exterior surface of supply pipe 1 in a resiliently tight fit. The wider end of said washer 20 is in cross-section relatively thicker and consequently less resilient than the narrower end. The thicker end of said washer is also provided with a flange 22 adapted to be engaged by ring 21. Said cross-section of said washer 20 presents a surface that at the narrower end thereof substantially comes to a point. This construction of washer 20 imparts the characteristic of permitting flow of fluid in a direction from the supply pipe 1, through the valve system, and to the interior of tank 2. The pressure of the fluid overcomes the resilient constricting tendency of the narrower end of washer 20. However, if the pressure of the fluid should be reversed due to a reduced pressure condition in supply pipe 1, no flow of fluid will be permitted from the supply tank 2 to the said supply pipe 1. In this situation, the pressure of the fluid would tend to compress the narrower end of washer 20 around supply pipe 1 and this provides an effective seal to such reversed flow.

It is obvious to those skilled in the art that my invention is by no means limited to the particular organizations and structures shown. For example, the collar 10 and washer 20 of my invention may be utilized other than in association with a conventional valve system, and may, in view of its specific construction for instance, be arranged to serve as an independent one-way valve. My invention may have application other than to toilet flushing systems. In addition, it is within the purview of my invention to provide a conventional valve system at one location, and lead the output therefrom by a suitable duct to the fluid flow adjusting and controlling elements described at a removed location. In this modification, suitable elements may be provided to perform the functions of the valve cylinder 3 and supply pipe 1 in forming a portion of an adjustable annular path. My invention also is clearly adapted for use in controlling the flow of matter in any fluid state, such as a gas, for example.

What I claim is:

1. In a valve, an inner hollow cylindrical member, an outer hollow cylindrical member concentric therewith, the exterior wall of said inner member being spaced from the interior wall of said outer member, whereby a chamber is formed between said members, means at one end of said chamber for manually varying the cross-sectional area of a portion of said chamber, means at the other end of said chamber adapted to permit only the outflow of fluid therefrom, said means comprising an annular resilient member forming a portion of said outer cylindrical member, said annular resilient member at one end thereof being spaced from said inner cylindrical member, and at the other end forming a resiliently tight engagement with a periphery of the said inner cylindrical member, whereby said first and second means are adapted to control the rate, and prevent the reversal of flow respectively, of fluid therethrough.

2. In a valve, means for preventing the reverse flow of fluid, said means comprising in combination a supply pipe, an outlet end for said supply pipe, a chamber enclosing said outlet end, an outlet end for said chamber, a frusto-conical collar of resilient material, the larger end of said collar being formed integral with a flange portion constituting a gasket for sealing said larger end against said outlet end of said chamber, the narrower end of said collar embracing said supply pipe, and a retaining ring attached to said outlet end of said chamber for holding said gasket under compression, said collar and said supply pipe providing an annular outlet for said fluid when the narrower end of said collar is expanded away from said supply pipe in response to fluid pressure in said chamber, and also providing a seal against reverse flow of fluid when said narrower end of said collar is contracted in the absence of substantial pressure in said chamber.

PETER GEORGE FUNK.